United States Patent [19]

Kiguchi

[11] Patent Number: 4,980,717
[45] Date of Patent: Dec. 25, 1990

[54] IMAGE RECORDING METHOD AND APPARATUS

[75] Inventor: Masao Kiguchi, Yokohama, Japan

[73] Assignee: Canon Kabushiki Kaisha, Tokyo, Japan

[21] Appl. No.: 262,822

[22] Filed: Oct. 26, 1988

[30] Foreign Application Priority Data

| Oct. 27, 1987 | [JP] | Japan | 62-270949 |
| Dec. 22, 1987 | [JP] | Japan | 62-324644 |
| Dec. 22, 1987 | [JP] | Japan | 62-324645 |
| Dec. 24, 1987 | [JP] | Japan | 62-327884 |
| Dec. 24, 1987 | [JP] | Japan | 62-327885 |

[51] Int. Cl.$^5$ .............................. G03B 15/00
[52] U.S. Cl. .......................... 355/50; 355/309; 355/316
[58] Field of Search .............. 355/309, 316, 50; 271/3

[56] References Cited

U.S. PATENT DOCUMENTS 4,849,824 7/1989 Sakuragi et al. .............. 355/309 X

FOREIGN PATENT DOCUMENTS

| 44-112210 | 6/1969 | Japan . |
| 50-7928 | 3/1975 | Japan . |
| 59-40759 | 3/1984 | Japan . |
| 60-193746 | 12/1985 | Japan . |

Primary Examiner—L. T. Hix
Assistant Examiner—D. Rutledge
Attorney, Agent, or Firm—Fitzpatrick, Cella, Harper & Scinto

[57] ABSTRACT

An image recording apparatus selects one of a plurality of recording sheets and conveys it to an image recording unit and image recording is effected on the selected recording sheet, having first recording sheet detecting means for detecting the presence of the recording sheets at a first predetermined position on the conveyance path of the recording sheets upstream of the recording unit, second recording sheet detecting means for detecting the presence of the recording sheets at a second predetermined position on the conveyance path of the recording sheets downstream of the recording unit, and control means for conveying only one recording sheet to the recording unit and conveying the leading end edge of the other recording sheet to a recording standby position upstream of the recording unit in conformity with the result of detection by the first and second detecting means. An image recording method selects one of a plurality of recording sheets and conveys it to an image recording unit and image recording is effected on the selected recording sheet and wherein the presence of the recording sheets is detected at a first position upstream of the recording unit and the presence of the recording sheets is detected at a second position downstream of the recording unit, and only one recording sheet is conveyed to the recording unit and the other recording sheet is conveyed to a recording standby position upstream of the recording unit in conformity with the result of the two detections.

8 Claims, 22 Drawing Sheets

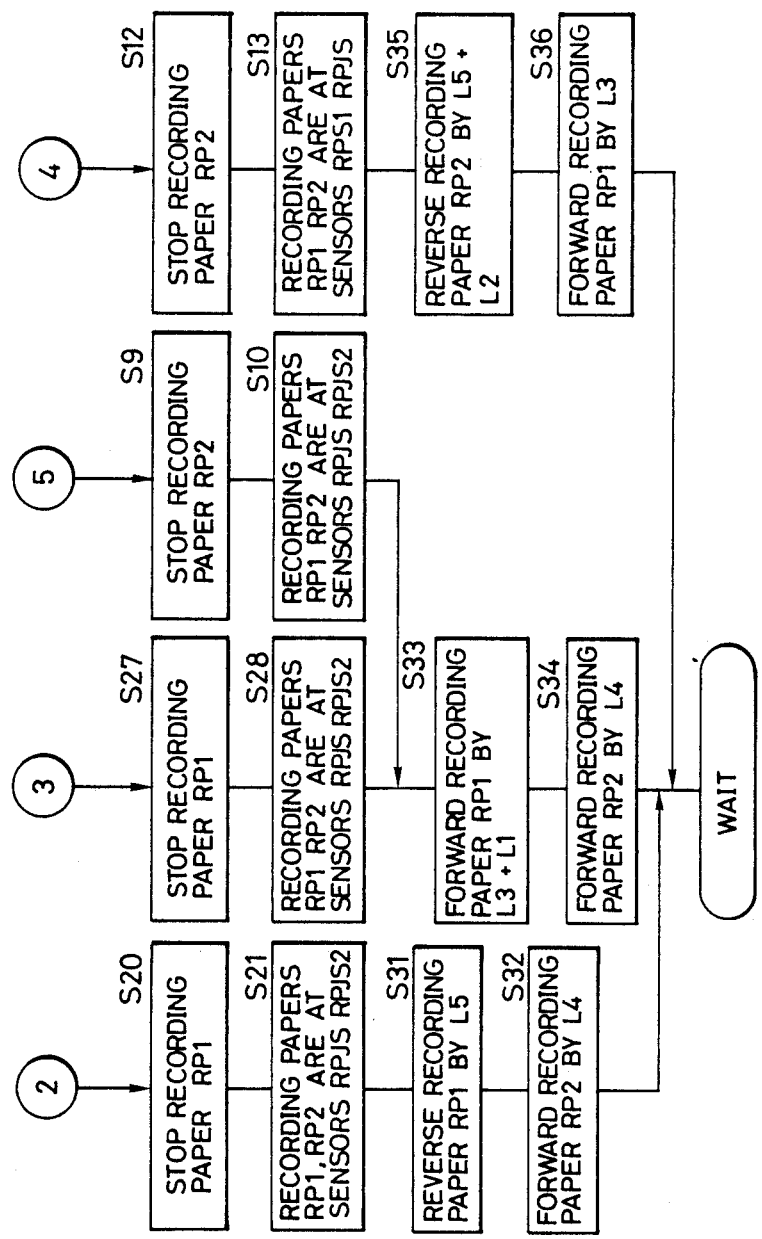

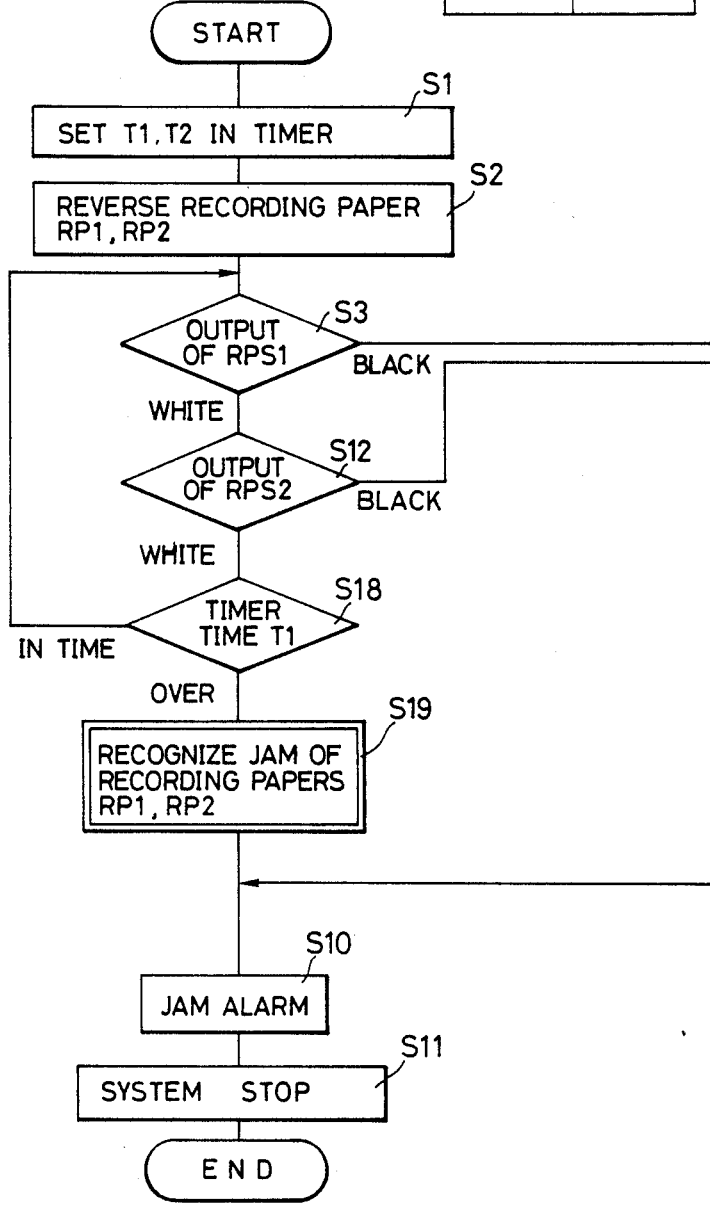

IMAGE RECORDING METHOD AND APPARATUS

BACKGROUND OF THE INVENTION

1. Field of the Invention

This invention relates to an image recording method and apparatus in which a plurality of rolls of recording sheets are provided and image recording is effected on selected one of the plurality of rolls of recording sheets. This invention is applicable to a facsimile apparatus, a copying apparatus or a printer.

2. Related Background Art

In a conventional recording apparatus wherein a plurality of rolls of recording sheets can be contained, the positions of the leading end edges of the recording sheets cannot be known during the power-ON, after the opening and closing of the cover, after the depression of the stop key during recording, or during the rising of the system. So, in order to adjust the positions of the leading end edges of the recording sheets, the contained recording sheets are fed respectively, are cut by a cutter, and then are returned by a predetermined amount to bring the recording sheets into a standby condition.

The above-described conventional apparatus suffers from the problems that the recording sheets must be cut each time the rising of the system occurs and that after the rising of the system, the timing at which the system can be used may be delayed by the time required for the cutting operation.

Also, the above-described conventional apparatus suffers from the problem that if the recording sheets come to a platen roller, where a platen motor stops and moreover the torque of a feed motor is small when the feed motor is being rotated in a reverse direction, the feed motor cannot pull the sheets and the feed motor falls into disorder and may sometimes produce unpleasant sound.

Also, the above-described conventional apparatus suffers from the problem that if the conveyance of two recording sheets is stopped and the detecting operation is terminated when the leading end edge of one recording sheet is detected, the recording sheet whose leading end edge is not detected may twine around the platen roller or may be jammed in the cutter unit and such trouble may sometimes not be detected.

Further, the above-described conventional apparatus suffers from the problem that even if the decision by a recording sheet sensor is black with regard to one recording sheet, it may sometimes not be determined whether it means the absence of the sheet or the detection of the near-end mark. Also, the above-described conventional apparatus suffers from the problem that even when the near-end mark is detected, the leading end edge of the recording sheet may sometimes not be detected.

Further, the above-described conventional apparatus suffers from the problem that by the influences of the irregularity of the sensitivity of a photosensor, the irregularity of the mounted position of a mechanism, temperature and other factors, the position of the leading end edge of the recording sheet may sometimes be greatly displaced back and forth from the center of the photosensor and it may be difficult to detect the position of the leading end edge of the recording sheet accurately.

SUMMARY OF THE INVENTION

It is an object of the present invention to provide an image recording method and apparatus in which, prior to effecting image recording, a recording sheet can be quickly positioned at a predetermined standby position for effecting recording.

It is another object of the present invention to provide an image recording method and apparatus in which, when positioning a recording sheet at a predetermined standby position for effecting recording (so-called initialization of the recording sheet) prior to effecting image recording, no unpleasant sound of a motor is produced.

It is still another object of the present invention to provide an image recording method and apparatus in which even if the other recording sheet than a recording sheet whose leading end edge has been detected earlier twines around a platen roller or is jammed at a cutter unit, the abnormal state can be detected.

It is yet still another object of the present invention to provide an image recording method and apparatus in which when a recording sheet detecting sensor detects "black" with regard to one recording sheet, whether it means the detection of the "absence of a recording sheet" or the "near-end mark" can be determined and even when the "rear-end mark" has been detected, the leading end edge of the recording sheet can be detected.

It is a further object of the present invention to provide an image recording apparatus provided with a photodetector device which is capable of detecting the position of the leading end edge of a recording sheet accurately.

BRIEF DESCRIPTION OF THE DRAWINGS

FIG. 4 shows a state in which recording paper RP1 is in a preliminary conveyance position and recording paper RP2 is in a recording position.

FIGS. 5A, 5B and 6 are flow charts showing the operation in the first embodiment.

DESCRIPTION OF THE PREFERRED EMBODIMENTS

A first embodiment of the present invention will hereinafter be described with reference to the drawings.

The embodiment which will hereinafter be described is such that the presence of each recording paper is detected at a first position on the conveyance path of each recording paper which is upstream of a recording unit, the presence of each recording paper is detected at a second position on the conveyance path of each recording sheet which is downstream of the recording unit, and the leading end edge of each recording paper is conveyed to the recording unit or a conveying unit without the recording paper being cut while the output of each detecting means is monitored. Accordingly, according to the present embodiment the recording paper is not wastefully used and the timing at which the system can be used is not delayed after the rising of the system.

Figure 1:
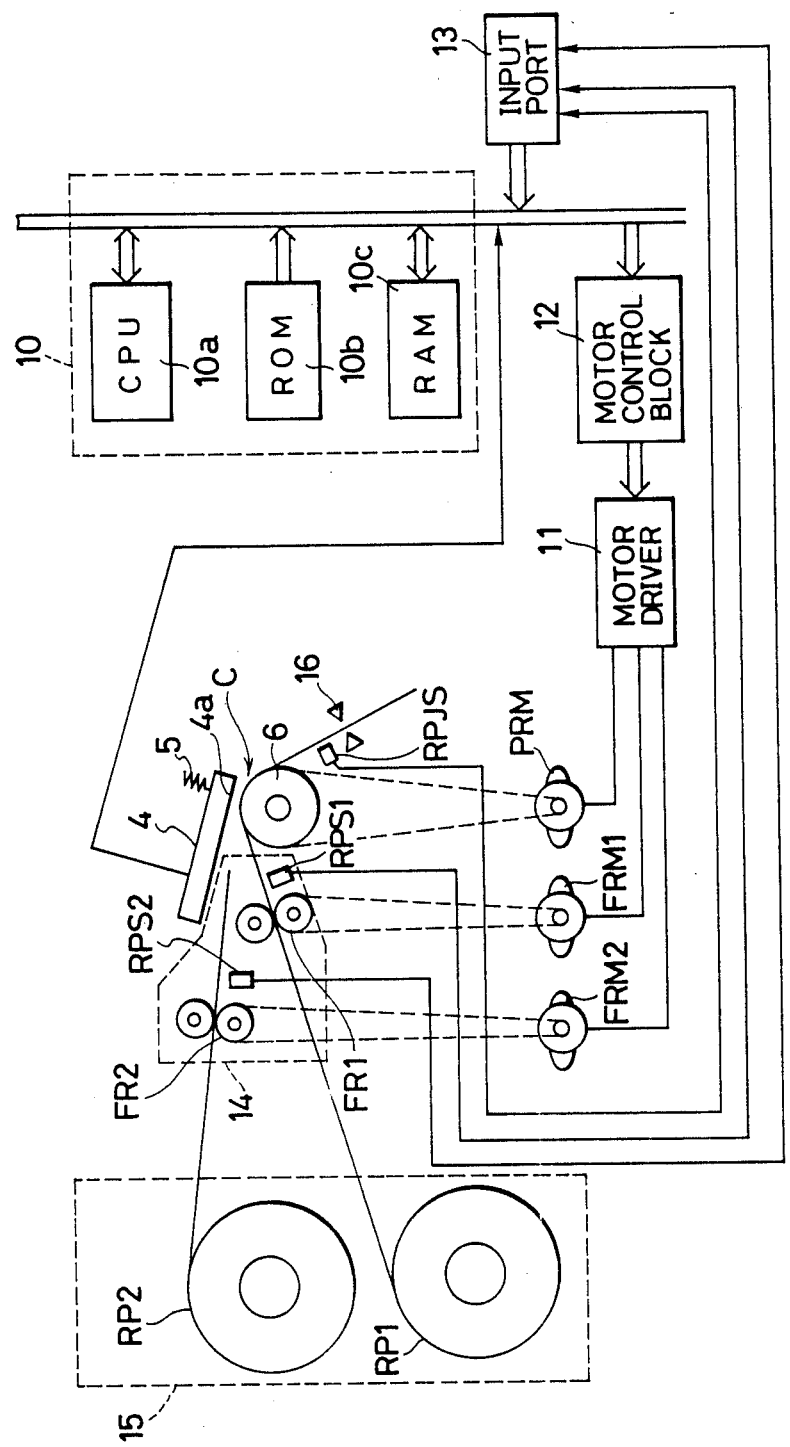
FIG. 1 is a block diagram showing a first embodiment of the present invention.

FIG. 1 shows an example of the construction of a facsimile apparatus provided with an automatic changeover double roll containing unit according to an embodiment of the present invention.

This embodiment has a roll of recording paper RP1 at this side, a roll of recording paper RP2 at the inner side, a feed roller FR1 for conveying the recording paper RP1 in a condition off a platen roller 6, a feed roller FR2 for conveying the recording paper RP2 in a condition off the platen roller 6, a sensor RPS1 for detecting the black band of the recording paper RP1, a sensor RPS2 for detecting the black band of the recording paper RP2, a thermal head 4 (having a plurality of heat generating elements 4a) for recording images on the selected recording paper RP1 or RP2, and a spring 5 for producing a pushing force between the thermal head 4 and the platen roller 6. The platen roller 6 conveys the selected recording paper to a recording station.

This embodiment further has a platen motor PRM for driving the platen roller 6, feed motors FRM1 and FRM2 for driving the feed rollers FR1 and FR2, respectively, a main control device 10 such as a microcomputer for controlling these, a motor driver 11 for driving motors 7, 8 and 9, and a motor control block 12 for producing a motor phase signal to be supplied to the motor driver 11. This embodiment is further provided with an input port 13 for inputting the information of the sensors RPS1 and RPS2, a recording paper conveying unit 14 (provided with the feed rollers FR1 and FR2) for feeding and returning the recording paper to a recording unit C comprised of the thermal head 4 and the platen roller 6, a containing unit 15 for containing the recording paper therein, and a cutter 16 for cutting the recording paper.

Also provided is a paper sensor RPJS for detecting the recording paper RP1 and RP2 downstream of the platen roller 6. Various portions associated with the main control device 10 are controlled by a CPU 10a such as a microprocessor. In addition to this CPU 10a, the main control device 10 is provided with an ROM 10b storing the control program of the CPU 10a and various data therein, an RAM 10c for temporarily preserving various data as the work area of the CPU 10a, etc.

Figure 2:
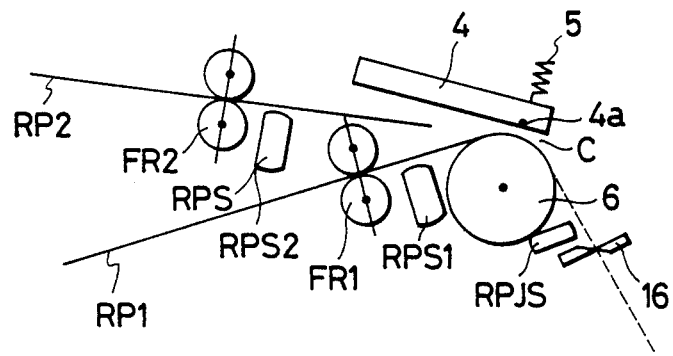
FIGS. 2, 3 and 4 show typical ones of the conveyed states of recording paper in the first embodiment.
Figure 3:
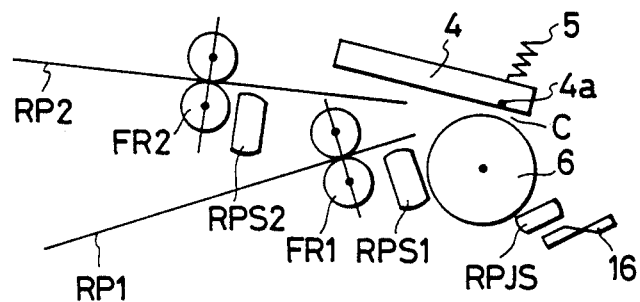
Figure 4:
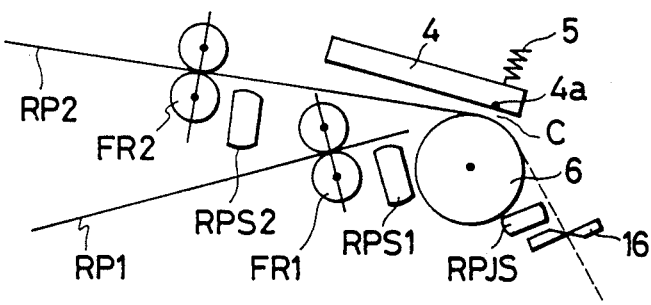

FIG. 2 shows the recording paper RP2 as it is at a preliminary conveying position and the recording paper RP1 as it is at a recording position. FIG. 3 shows the recording paper RP1 and the recording paper RP2 as they are at the preliminary conveying position, and the state in which the recording paper RP1 has been rewound from the recording position to the upstream side thereof is the same as the state in which the recording paper RP2 has been rewound from the recording position to the upstream side thereof. FIG. 4 shows the recording paper RP1 as it is at the preliminary conveying position and the recording paper RP2 as it is at the recording position.

The operation of the above-described embodiment will now be described.

Figure 5A:
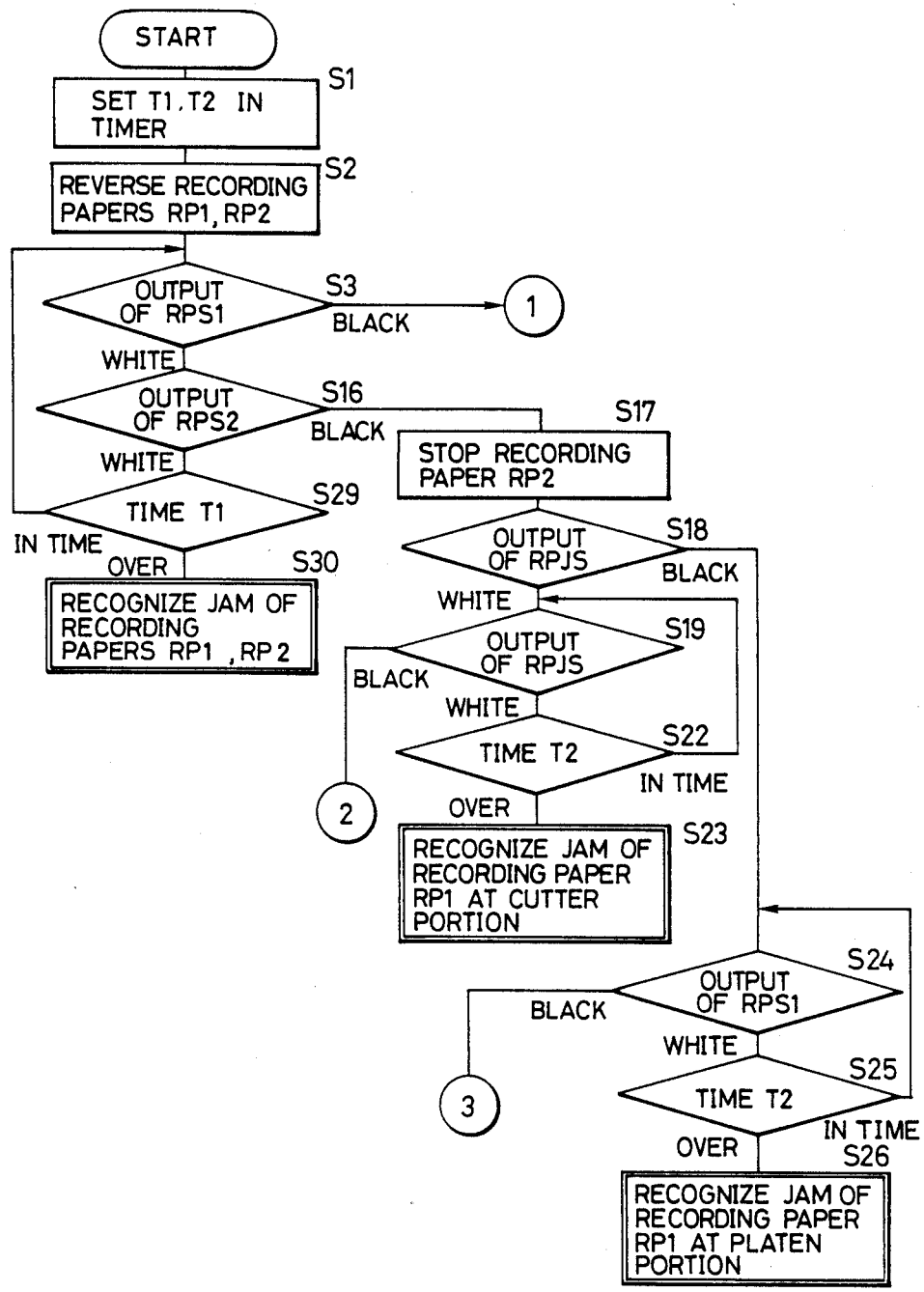
Figure 5B:
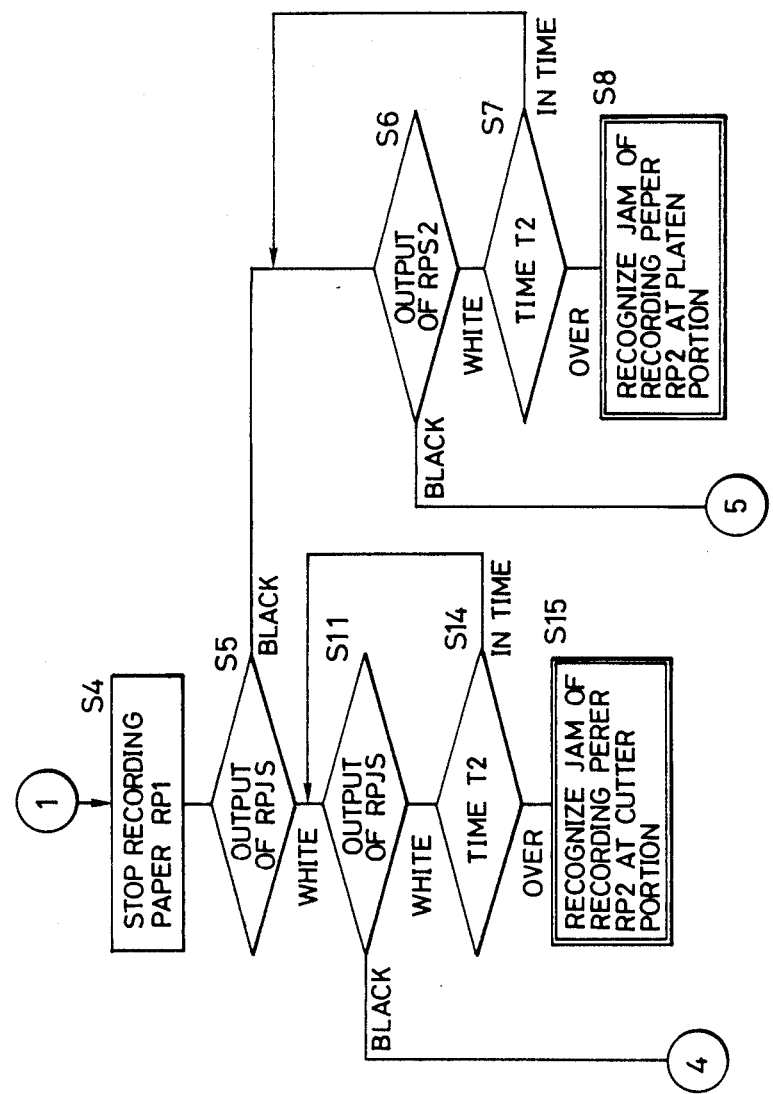

FIGS. 5A, 5B and 6 are flow charts showing the operation of the above-described embodiment.

During the rising of the system such as power ON, in the case of a double roll machine like the present system, the leading end edges of the respective recording paper are such as shown in FIGS. 2, 3 and 4.

In the initial state, the sensors RPS1 and RPS2 detect white. One of the recording paper RP1 and RP2 is off the platen roller 6 without fail and therefore, the time for which one of the recording paper RP1 and RP2 is moved by a distance (L2+L4) over which it is reversed longer is defined as T1, and a time sufficiently longer than the time T1 is defined as T2, and the timer times T1 and T2 are set in a timer (S1).

The outputs of the sensors RPS1 and RPS2 are checked to detect the leading end edges of the recording paper RP1 and RP2 while the recording paper RP1 and RP2 are reversed upstream at a time (S3, S16). At that time, the recording paper RP1 and RP2 may both be jammed and fail to be conveyed to the positions of the sensors RPS1 and RPS2, and it is also checked that the timer time T1 is not over (S29).

When at S3, the sensor RPS1 detects black, the recording paper RP1 is stopped, and the then state of the sensor RPJS is checked (S5), and at what position the leading end edge of the remaining recording paper (in this case, RP2) is checked.

When the sensor RPJS has detected black (S5), the leading end edge of the recording paper RP2 is upstream of the sensor RPJS and therefore, the output of the sensor RPS2 is intactly checked (S6), and whether the timer time T2 is over is also checked while the leading end edge of the recording paper RP2 is detected (S7). If the timer time T2 is over, it is judged that the recording paper RP2 is jammed at the platen portion, and jam alarm is put out (S8).

If at S6, the leading end edge of the recording paper RP2 can be detected, the recording paper RP2 is stopped and the operation is terminated.

Figure 9:
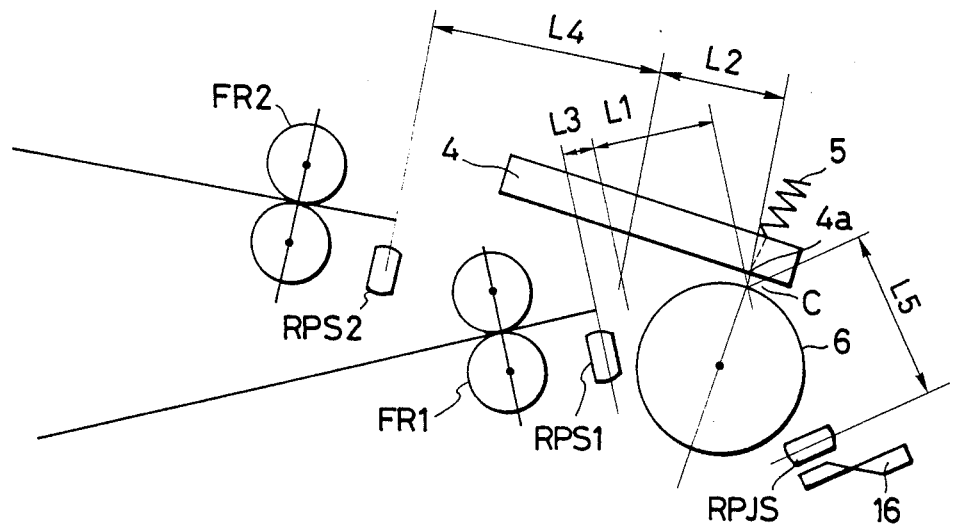
FIGS. 9 and 10 show the conveyed states of the recording paper RP1 and the recording paper RP2 in the first embodiment.
Figure 10:
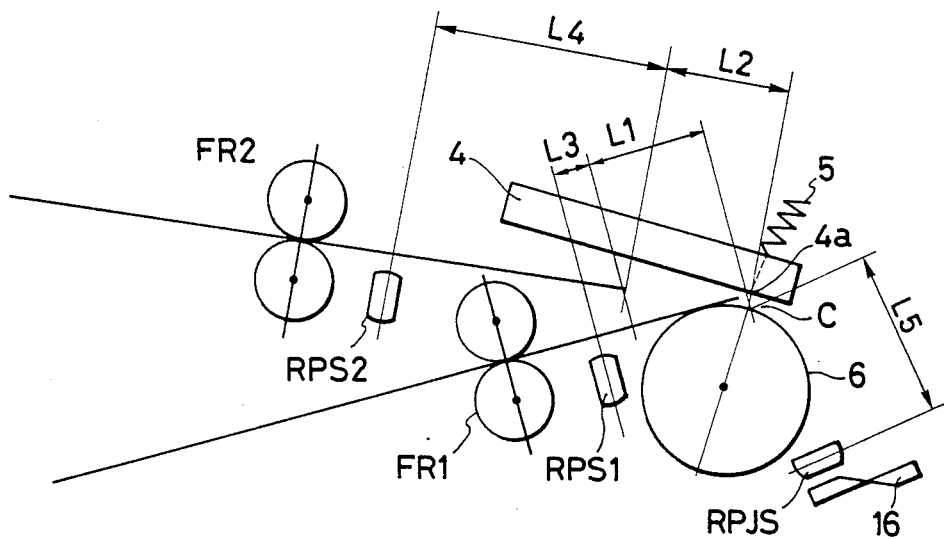

At this time, the recording paper RP1 and RP2 are at the sensors RPS1 and RPS2, respectively, as shown in FIG. 9 (S10). There, the recording paper RP1 is fed by a distance (L3+L1) (S33), the recording paper RP2 is fed by a distance L4 (S34), and a series of operations are terminated. The then state is shown in FIG. 10. The distances from the sensors RPS1, RPS2 and RPJS to the recording position and the preliminary conveying position are pre-stored in an ROM (read-only memory).

Figure 7:
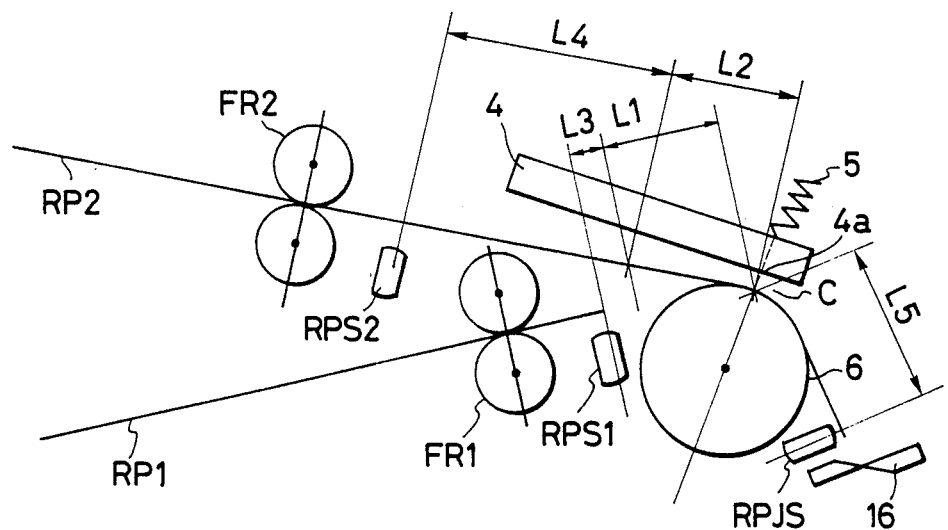
FIGS. 7 and 8 show the states in which a sensor RPJS in the first embodiment has detected the recording paper RP2 and the recording paper RP1.

When at S5, the sensor RPJS has detected white, the leading end edge of the recording paper RP1 is downstream of the sensor RPJS and therefore, the reversing is continued until the sensor RPJS becomes black, and when the leading end edge of the recording paper RP1 is detected and the sensor RPJS becomes black, the recording paper RP2 is stopped (S12). At this time, the leading end edges of the recording paper RP1 and RP2 are at the sensors RPS1 and RPJS, respectively, as shown in FIG. 7 (S13). Then, the recording paper RP2 is reversed by a distance (L5+L2) (S35), the recording paper RP1 is fed by a distance L3 (S36), and a series of operations are terminated. The then state is shown in FIG. 10.

On the other hand, when at S16, the leading end edge of the recording paper RP2 has been detected earlier, the recording paper RP2 is stopped (S17), and thereafter, an algorithm similar to S4—S15 takes place (S18—S28). In this case, the recording paper RP1 and RP2 become converse and the sensors RPS1 and RPS2 become converse.

Figure 8:
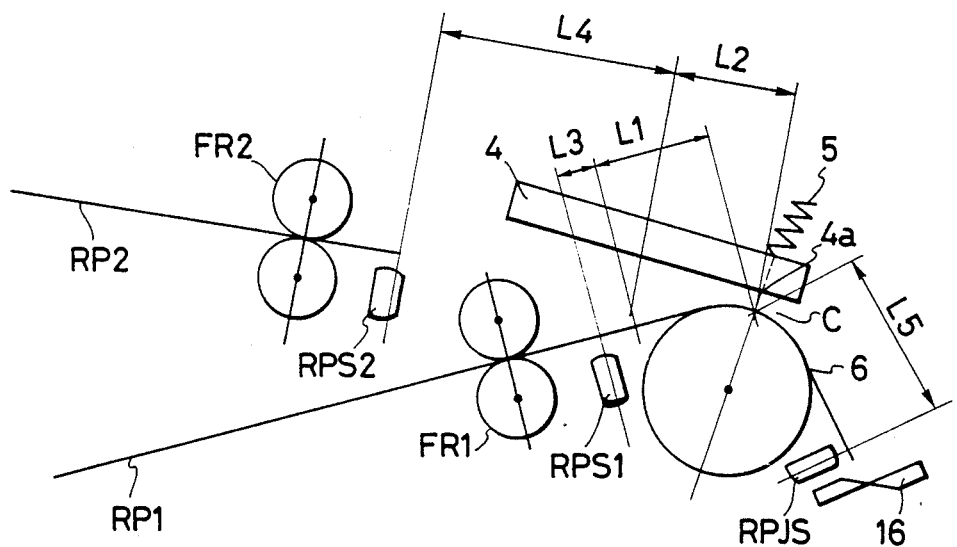

When at S18, the sensor RPJS has detected white, the leading end edge of the recording paper RP1 is downstream of the sensor RPJS and therefore, the reversing is continued until the sensor RPJS becomes black, and when the leading end edge of the recording paper RP1 is detected and the sensor RPJS has become black, the recording paper RP1 is stopped (S20). At this time, the leading end edges of the recording paper RP1 and RP2 are at the sensors RPJS and RP2, respectively, as shown in FIG. 8 (S21). Then, the recording paper RP1 is reversed by a distance L5 (S31), the recording paper RP2 is fed by a distance L4 (S32), and a series of operations are terminated and the standby state is entered. The then state is shown in FIG. 10.

Also, when the recording paper RP1 has been stopped (S27), the recording paper RP1 and the recording paper RP2 are at the positions of the sensors RPS1 and RPS2, respectively, as shown in FIG. 9.

In the above-described embodiment, besides the occurrence of the jam of the recording paper during the ordinary recording, the jam during the rising of the system can also be easily detected at the same time. Further, in the above-described embodiment, the leading end edge of each recording paper can be brought into the standby state without paper cutting being effected, and the time loss during the rising of the system can be decreased.

According to the embodiment described above, the recording paper is not wastefully used, and the timing at which the system can be used after the rising of the system is not delayed.

A second embodiment of the present invention will now be described with reference to FIGS. 11 to 19. With regard to a block diagram showing this embodiment and typical one of the states of conveyance of the recording paper, FIGS. 1 to 4 are invoked. However, in the present embodiment, the sensor RPJS used in the aforedescribed first embodiment is unnecessary.

The second embodiment which will hereinafter be described is such that the presence of each recording paper is detected at a predetermined position on the conveyance path of each recording paper which is upstream of a recording unit, the position of the leading end edge of each recording paper is controlled and after the position of the leading end edge of each recording paper is detected, shift is made to the next control and therefore, even if the other recording paper than the recording paper whose leading end edge has been detected earlier twines around the platen roller or is jammed at the cutter portion, such abnormal state can be detected.

The operation of the present embodiment will now be described.

First, in a double roll machine like the present system, where the leading end edges of the recording paper RP1 and the recording paper RP2 are present in the initial state of the system such as the time when the main power of the system is ON is not known.

Now, the leading end edges of the recording paper RP1 and RP2 are considered to be present in the states shown in FIGS. 2, 3 and 4. Accordingly, if whether the leading end edge of at least one of the recording paper RP1 and RP2 is off the platen roller is known, the next process such as paper cutting can be effected smoothly. Accordingly, which of the recording paper RP1 and RP2 is off the platen roller in the initial state of the system such as power ON is first detected. In this case, the positions of the leading end edges of the recording paper RP1 and RP2 are detected so that paper cutting may be effected smoothly.

Figure 11B:
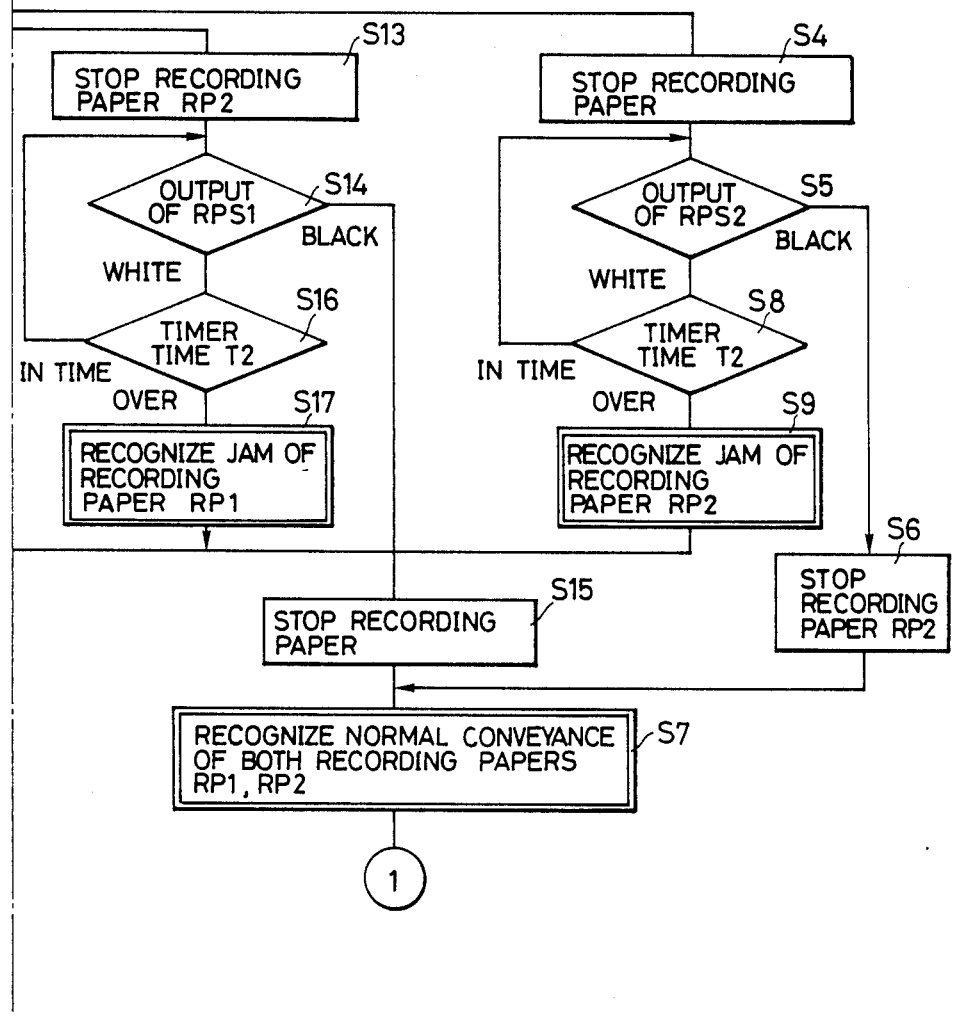
FIGS. 11 and 12 are flow charts showing the operation in a second embodiment of the present invention.
Figure 12:
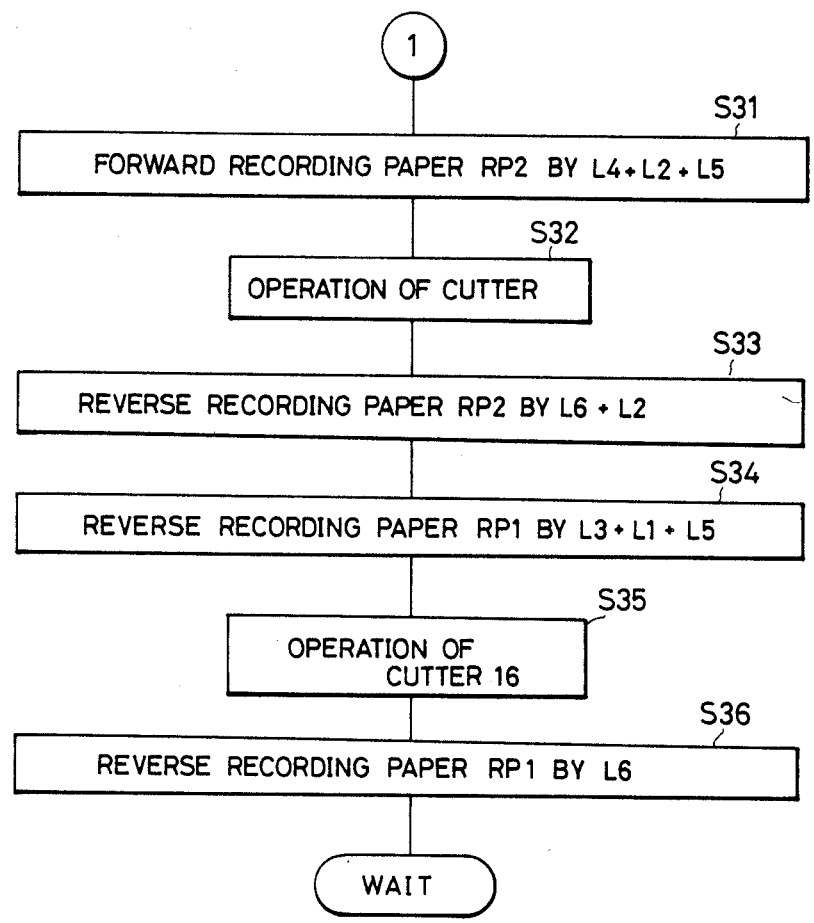

FIGS. 11 and 12 are flow charts showing the operation of detecting the leading end edge of each recording paper in the above-described embodiment.

First, one of the recording paper RP1 and the recording paper RP2 is off the platen roller without fail and therefore, the time for which one of the recording paper RP1 and RP2 is moved by a distance (L2+L4) over which it is reversed longer is defined as T1, and a time sufficiently longer than the time T1 is defined as T2, and the timer times T1 and T2 are set in a timer (S1).

Figure 13:
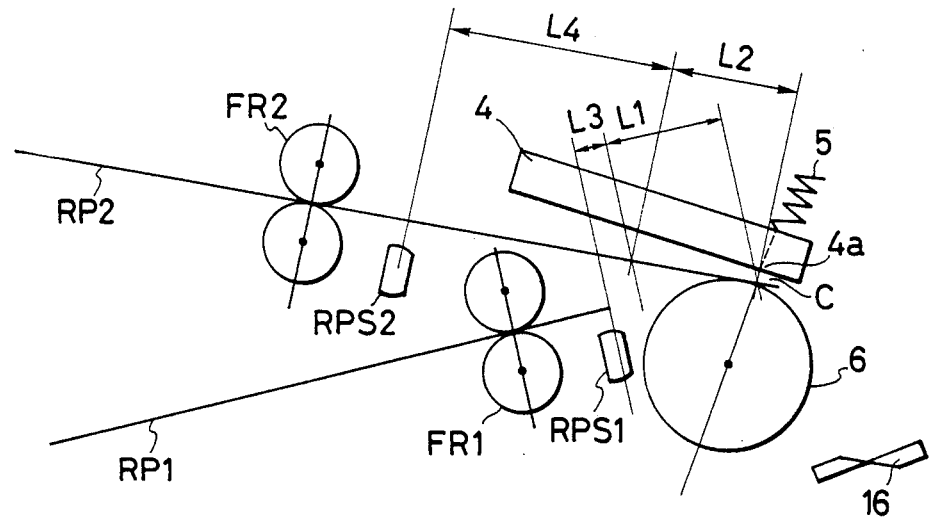
FIGS. 13 and 14 show the states in which the leading end edges of the recording paper RP1 and the recording paper RP2 have been detected.

The outputs of the sensors RPS1 and RPS2 are checked (S3, S12) while the recording paper RP1 and RP2 are reversed at a time (S2), and it is checked at the same time that this check time does not exceed the timer time T1 (S18). If the sensor RPS1 then detects black (S3), the recording paper RP1 is stopped (S4). This stopped state is shown in FIG. 13.

Subsequently, while only the sensor RPS2 is checked (S5), it is also checked that this check time does not exceed the timer time T2 (S8). If the timer time T2 is over, it is judged that the recording paper RP2 is jammed (S9), and jam alarm is put out (S10), and the system is stopped (S11).

Figure 15:
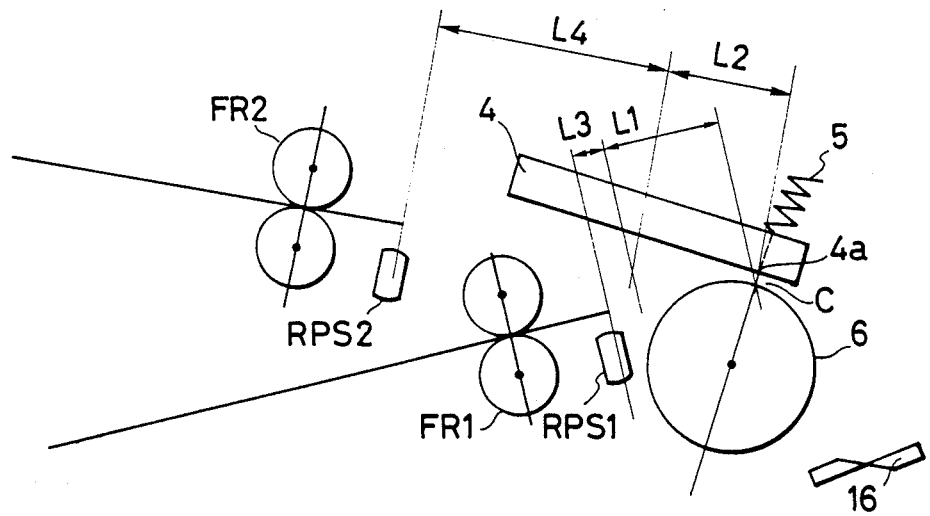
FIGS. 15 to 19 show the conveyed states of the recording paper RP1 and the recording paper RP2.

When at S5, the sensor RPS2 has detected black, it is judged that the leading end edge of the recording paper RP2 has been detected, and the recording paper RP2 is stopped (S6), and it is decided that the conveyance of both of the recording paper RP1 and RP2 is normal (S7). The state in which the sensor RPS2 has become black at S5 is shown in FIG. 15.

Figure 14:
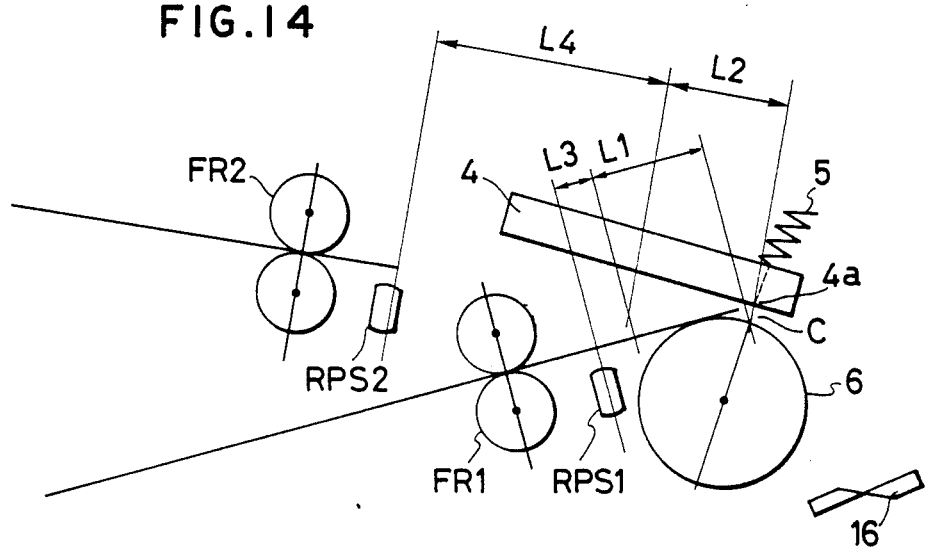

On the other hand, when at S12, it is judged that the sensor RPS2 is black (the state in this case is shown in FIG. 14), it is deemed that the leading end edge of the recording paper RP2 has been detected, and the recording paper RP2 is stopped (S13), and the remaining recording paper RP1 is checked (S14, S16). If the sensor RPS1 detects black within the timer time T2, the recording paper RP1 is stopped (S15), and if the timer time T2 is over, it is judged that the recording paper RP1 is jammed (S17).

Also, if at S18, the timer time T1 is over, it is judged that both of the recording paper RP1 and the recording paper RP2 are jammed (S18), and the system is stopped (S11).

FIG. 12 is a flow chart showing the operation in the above-described embodiment after it has been judged that both of the recording paper RP1 and the recording paper RP2 are being normally conveyed.

Figure 16:
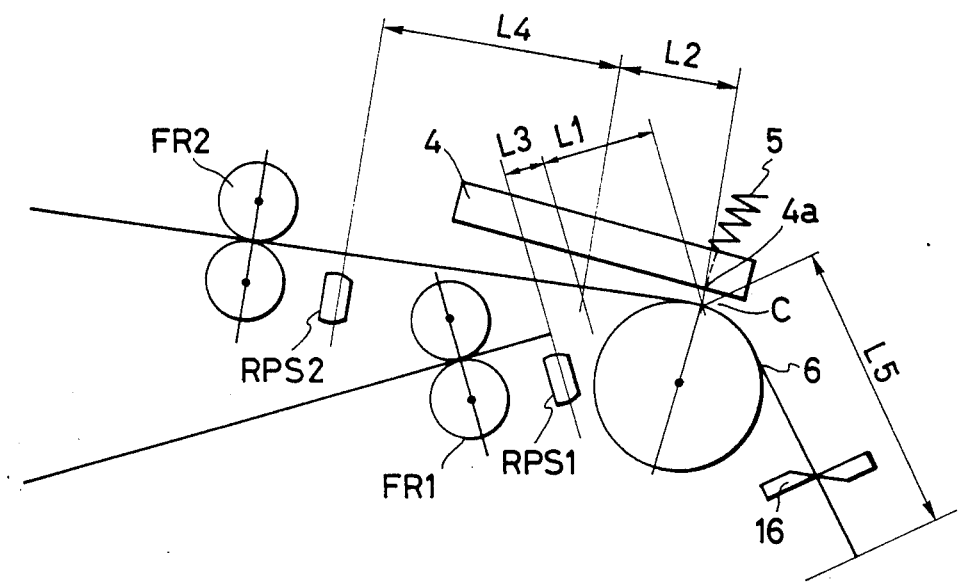
Figure 17:
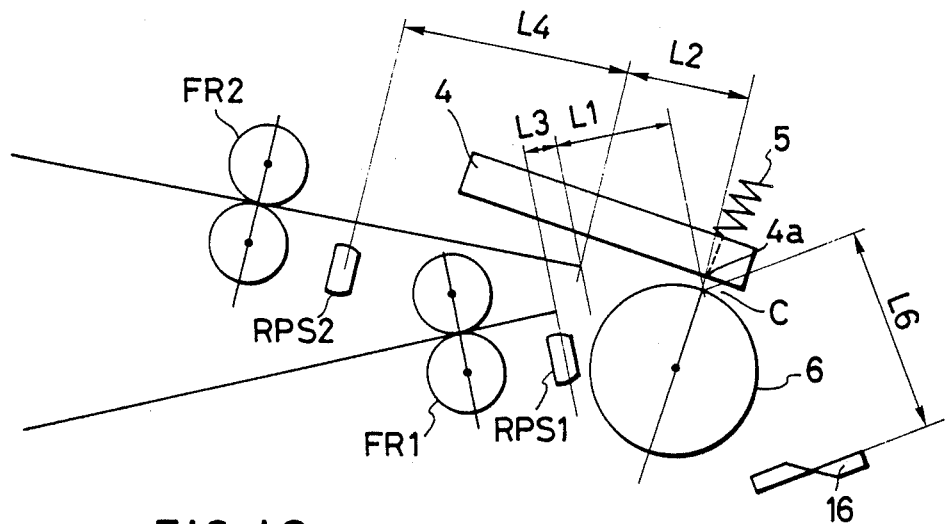

First, the recording paper RP2 is fed forward by a distance (L4+L2+L5) as shown in FIG. 16 (S31). Thereafter, the cutter is operated (S32), and the recording paper RP2 is fed reversely by a distance (L4+L2) shown in FIG. 14 (S33).

Figure 18:
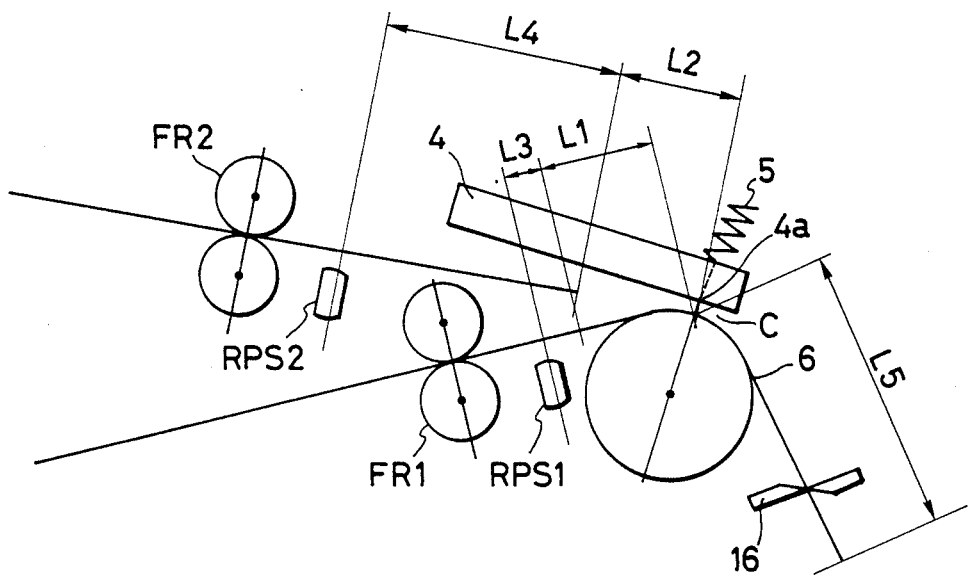
Figure 19:
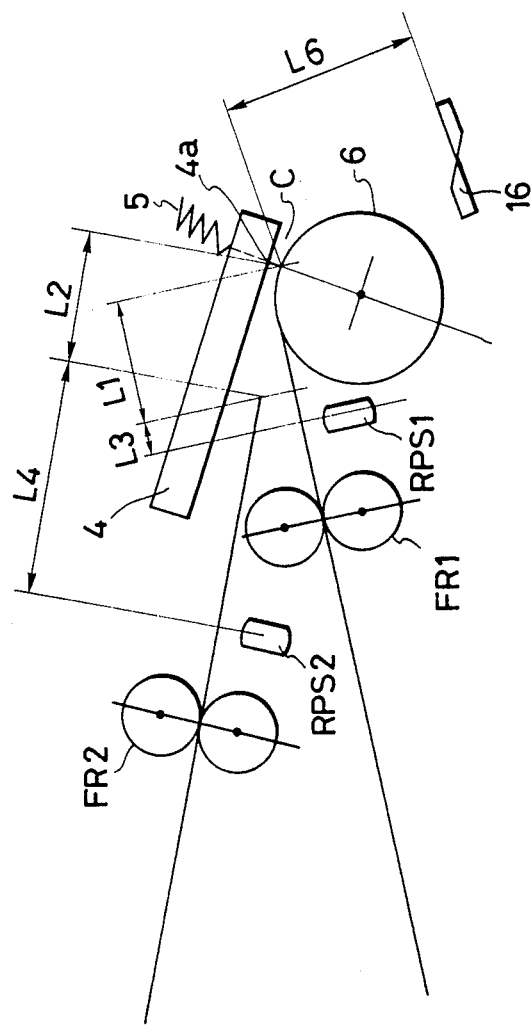

Subsequently, the recording paper RP1 is fed forward by a distance (L3+L1+L5) shown in FIG. 18 (S34), and the recording paper RP1 is cut (S35), and the recording paper RP1 is fed reversely by a distance L6 as shown in FIG. 19 (S36), whereupon the standby state is entered.

According to the present embodiment, even if the other recording paper than the recording paper whose leading end edge has been detected earlier twines around the platen roller or is jammed at the cutter portion, such abnormal state can be detected.

A third embodiment of the present invention will now be described with reference to FIGS. 20 and 21. In this embodiment, FIGS. 1–4 and FIGS. 7–10 used for the description of the first embodiment are intactly invoked.

The third embodiment which will hereinafter be described is such that the presence of each recording paper is detected at a first predetermined position on the conveyance path of each recording paper which is upstream of a recording unit, the presence of each recording paper is detected at a second predetermined position which is downstream of the recording unit and is not opposed to the near-end mark of each recording paper and the leading end edge of each recording paper is conveyed to the recording unit or a conveying unit while the output of each detecting means is monitored and therefore, when a recording paper sensor detects black with regard to one of the two types of recording paper, it can be decided whether the absence of the paper or the near-end mark has been detected, and even when the near-end mark has been detected, the leading end edge of that recording paper can be detected.

In the present embodiment, the recording paper sensor RPJS is a sensor for detecting the presence of the recording paper RP1 and RRP2 at the second predetermined position which is downstream of the recording unit C and is not opposed to the near-end marks of the recording paper RP1 and RP2.

Figure 20:
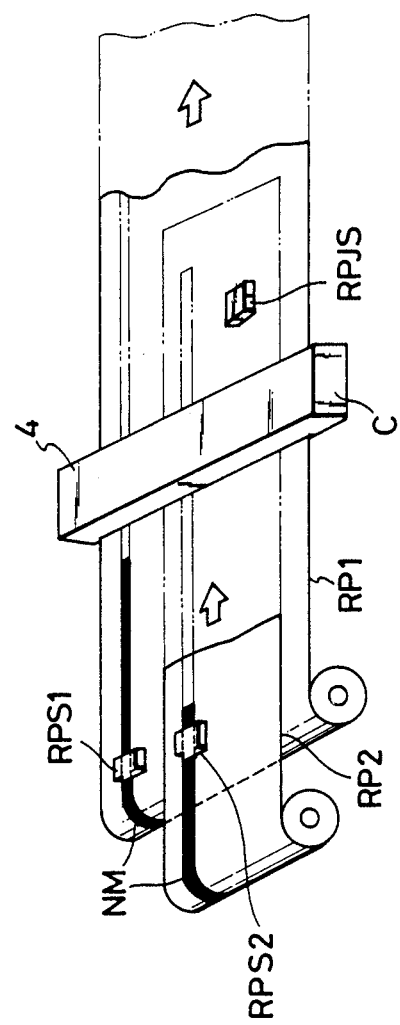
FIG. 20 shows the positional relation among sensors RPS1, RPS2 and RPJS in a third embodiment of the present invention.

FIG. 20 shows the positional relation among the sensors RPS1, RPS2 and RPJS in the present embodiment.

The operation of the present embodiment will now be described.

Figure 21A:
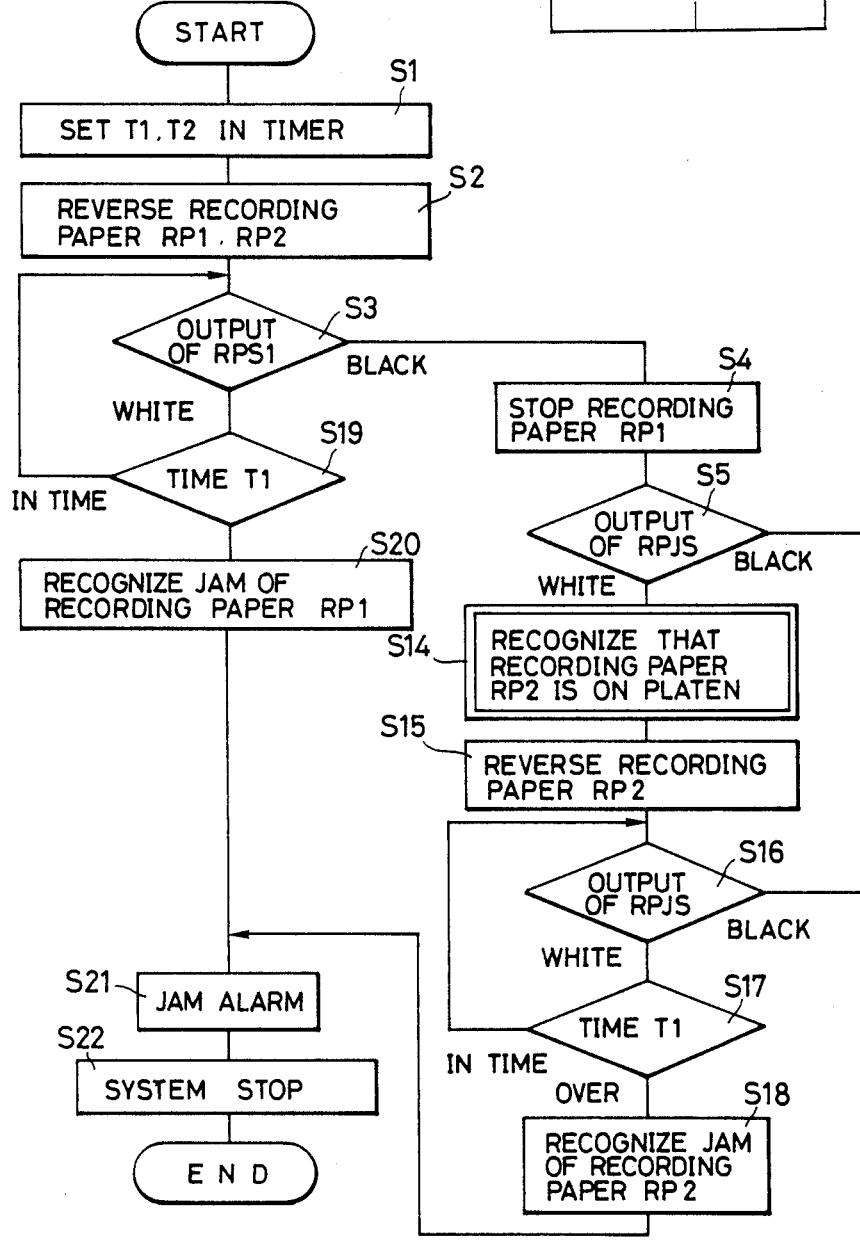
FIG. 21 is a flow chart showing the operation in the third embodiment.
Figure 21B:
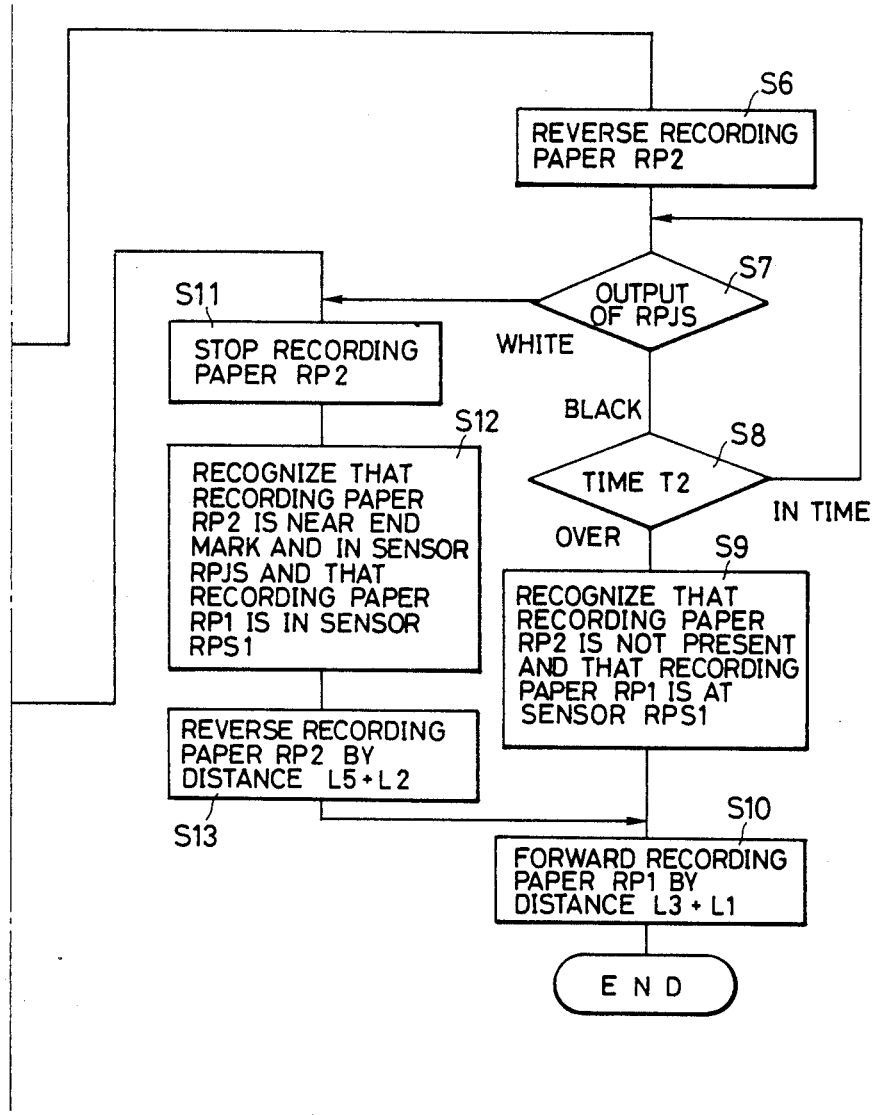

FIG. 21 is a flow chart showing the operation in the above-described embodiment.

In the startup of the system, when the sensor RPS1 detects white and the sensor RPS2 detects black, the recording paper RP1 is capable of recording, but as regards the recording paper RP2, whether the near-end mark thereof appears or is present at the platen roller is unclear even if the recording paper is absent or present.

First, when the recording paper has been reversed (that is, has been returned to the upstream side), the time for which the recording paper is moved by a distance (L5+L2+L4) is defined as T2, and a time sufficiently longer than the time T2 is defined as T1, and the times T1 and T2 are set in a timer (S1).

Subsequently, the recording paper RP1 and the recording paper RP2 are both reversed at a time (S2), and are checked until the output of the recording paper sensor RPS1 changes from white to black (S3). Simultaneously, therewith, whether the timer time T1 is over is also checked (S19), and if it is over, it is judged that the recording paper RP1 is jammed (S20). Thereafter, jam alarm is put out (S21), and the system is stopped (S22).

When at S3, the sensor RPS1 detects black and detects the leading end edge of the recording paper RP1, the recording paper RP1 is stopped (S4), whereafter the output of the sensor RPJS is checked, and when the sensor RPJS detects white (S5), it can be judged that the near-end mark has come to the platen (S14) and therefore, the recording paper RP2 is reversed (S15), and it is checked that the output of the sensor RPJS changes from white to black until the time T1 is over (S16). Since the detection of the change from white to black of the sensor RPJS means the detection of the leading end edge of the recording paper RP2, the recording paper RP2 is stopped (S11).

At this time, the recording paper RP1 is in a state in which it is capable of recording, the leading end edge of the recording paper RP1 is on the sensor RPS1 and the recording paper RP2 is in a state in which it is incapable of recording at the near-end mark, but it is recognized that the leading end edge of the recording paper RP2 is on the platen and is on the sensor RPJS (S12). The then state is shown in FIG. 7.

At S12, the recording paper RP2 is incapable of recording at the near-end mark, but is on the platen and therefore, it is reversed by a distance (L5+L2) (S13), whereafter the recording paper RP1 is forwarded by a distance (L3+L1) (S10) and is not cut, but alignment of the two types of recording paper in the double roll machine is effected. The then state is shown in FIG. 9.

When at S5, the sensor RPJS detects black, the recording paper RP2 is forwarded (S6), and is forwarded until the time T2 is over while the output of the sensor RPJS is checked (S7).

When the sensor RPJS detects white, the recording paper RP2 is stopped as at S16 (S11). Thereafter, a process similar to that has been described above is effected (S11, S12, S13).

When the sensor RPJS detects black (S7) and the time T2 is over (S8), it can be judged that the recording paper RP2 is absent and therefore, the operation is stopped. In this case, it is recognized that the recording paper RP1 is capable of recording and the leading end edge thereof is on the sensor RPS1 and the recording paper RP2 is absent (S9). The then state is shown in FIG. 8.

At S9, the recording paper RP2 is absent and therefore, the recording paper RP1 is intactly forwarded by a distance (L3+L1) and alignment can be effected in a manner similar to what has been described above. The then state is shown in FIG. 10.

When the time T1 has elapsed (S17) while at S16, the sensor RPJS detects white, it is recognized that the recording paper RP2 is jammed (S18), and jam alarm is put out (S21) and the system is stopped (S22).

In the above-described embodiment, no noise is produced in the sequence, and it is not necessary to effect an idle cutting operation, and the jam during normal recording and the jam during the startup of the system can be detected.

When the sensors RPS1 and RPS2 are detecting black and white, respectively, an algorithm similar to what has been described above is assumed simply by making the recording paper RP1 and RP2 converse and making the sensors RPS1 and RPS2 converse in the above-described embodiment.

According to the present embodiment, when the recording paper sensor has detected black with respect to one of the two types of recording paper, whether it means the detection of the absence of the paper or the detection of the near-end mark can be determined, and even when the near-end mark has been detected, the leading end edge of the recording paper can be detected.

A fourth embodiment of the present invention will now be described with reference to FIGS. 22 to 24. In the present embodiment, FIGS. 1 to 4 used for the description of the first embodiment are intactly invoked.

The fourth embodiment which will hereinafter be described is such that when one of upstream sheet detecting sensors provided upstream of a recording unit detects white and the other of the upstream sheet detecting sensors detects black, first and second recording sheets are conveyed by a first predetermined amount, and when the outputs of said one upstream sheet detecting sensor and said other upstream sheet detecting sensor do not vary, the first and second recording sheets are conveyed by a second predetermined amount and the recording sheet to be initialized (that is, to be positioned at a predetermined standby position for effecting recording) is judged in conformity with the output of a downstream sheet detecting sensor provided between the recording unit and a cutter and therefore, no unpleasant sound is produced from a feed motor and the reliability of the feed motor is not reduced.

In the present embodiment, the upstream sheet detecting sensors RPS1 and RPS2 are provided upstream of the recording unit C comprised of a thermal head 4 and a platen roller 6, and serve to detect the near-end marks of the sheets RP1 and RP2, respectively, or the absence of the sheets. The downstream sheet detecting sensor RPJS is provided between the recording unit C and the cutter 16. Further, the main control device 10 (see FIG. 1) is an example of the judging means for conveying the first and second recording sheets by the first predetermined amount when one of the upstream sheet detecting sensors detects white and the other of the upstream sheet detecting sensors detects black, conveying the first and second recording sheets by the second predetermined amount when the outputs of said one upstream sheet detecting sensor and said other upstream sheet detecting sensor do not vary, and judging the recording sheet to be initialized, in conformity with the then output of said downstream sheet detecting sensor.

The operation of the present embodiment will now be described.

Figure 22:
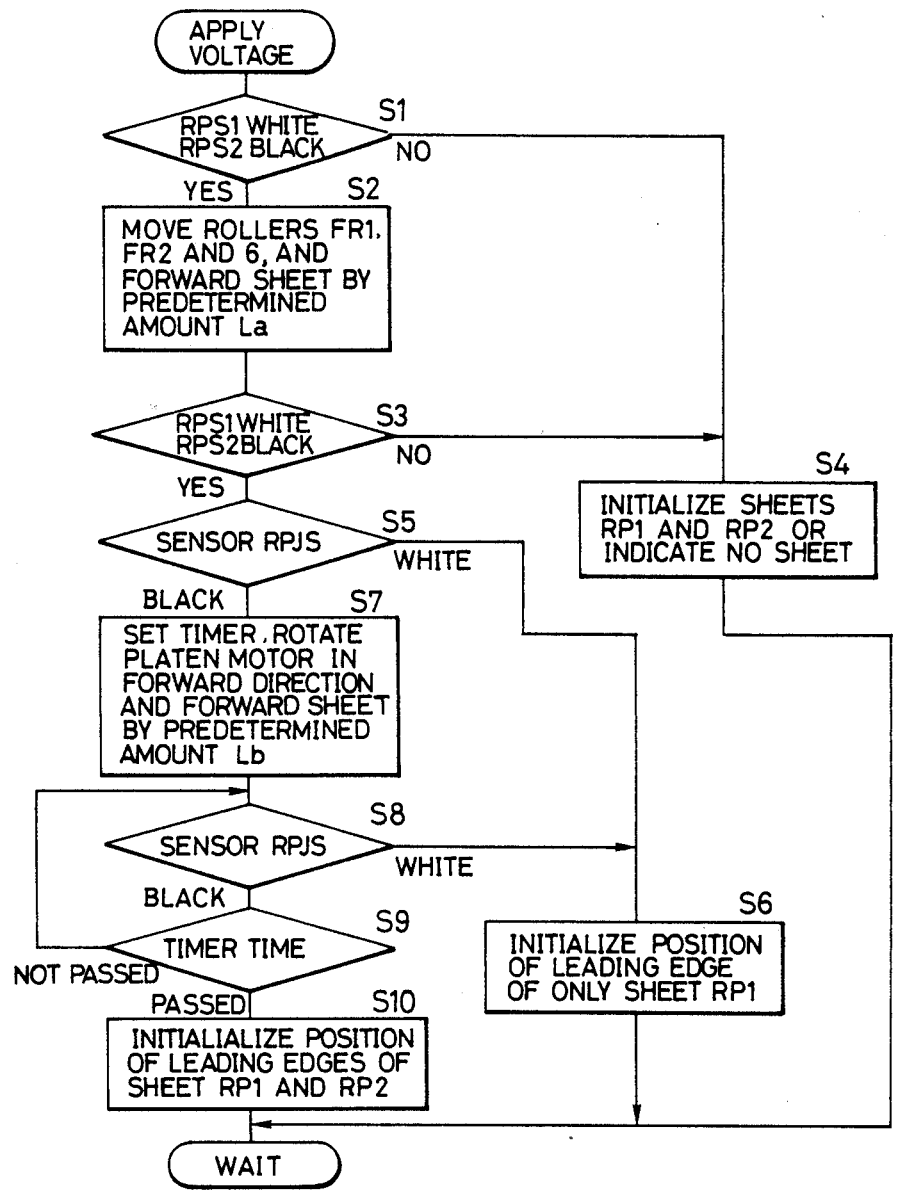
FIG. 22 is a flow chart showing the operation in a fourth embodiment of the present invention.

FIG. 22 is a flow chart showing the operation of the present embodiment.

When the main power of the system becomes ON (that is, after the irregular state has been restored), whether the upstream sheet detecting sensor RPS1 has first detected white and the upstream sheet detecting sensor RPS2 has detected black is judged (S1). If the sensors RPS1 and RPS2 detect white and black, respectively, feed rollers FR1 and FR2 and the platen roller 6 are rotated to advance the sheets by a predetermined amount La (a length sufficiently greater than the size of the sensors RPS1 and RPS2), and the outputs of the sensors RPS1 and RPS2 are again judged (S3).

If the sensors RPS1 and RPS2 do not detect white and black, respectively, that is, if the state of the leading end edges of the sheets has changed, the positions of the leading end edges of the sheets RP1 and RP2 are initialized or the absence of the sheets is indicated (S4). That is, if both of the sensors RPS1 and RPS2 detect white, the positions of the leading end edges of the sheets RP1 and RP2 are initialized, and if both of the sensors RPS1 and RPS2 detect black, the absence of the sheets is indicated, and the system stands by.

On the other hand, if the sensors RPS1 and RPS2 detect white and black, respectively, that is, if the state of the sheets has not changed, the output of the downstream sheet detecting sensor RPJS is examined (S5), and if this output is white, the position of the leading end edge of only the sheet RP1 is initialized (S6). The fact that at S5, the sensor RPJS has detected white shows that the sheet RP1 is present in the recording unit C, while the sheet RP2 is absent or is at the near-end mark. Even if the sheet RP2 is at the near-end mark, that near-end mark is not present in the recording unit C.

If at S5, the sensor RPJS detects black, the state of the sheets is unknown and therefore, a timer, not shown, is set, and the platen roller 6 is rotated in the forward direction to forward the sheet by a predetermined amount Lb (S7). The predetermined amount Lb is a length sufficiently greater the distance L3+L1+L5 shown in FIGS. 23 and 24. The distance L3 is the distance from the upstream sheet detecting sensor RPS1 to the standby position, the distance L1 is the distance from said standby position to the recording unit C, and the distance L5 is the distance from the recording unit C to the downstream sheet detecting sensor RPJS. The timer time of said timer is a time sufficiently longer than the time for which the sheet RP1 is moved by the distance L3+L1+L5.

If the sensor RPJS detects white at the end or in the course of the forward movement of the sheet (S8), the position of the leading end edge of only the sheet RP1 is initialized (S6).

On the other hand, if the sensor RPJS detects black even when said timer time has elapsed (S9), the sheet RP1 is not present in the recording unit C and the sheet RP2 is present in the recording unit C with the near-end mark remaining therein or is absent in the recording unit C and therefore, the positions of the leading end edges of the sheets RP1 and RP2 are initialized (S10), and the sheets stand by.

Figure 23:
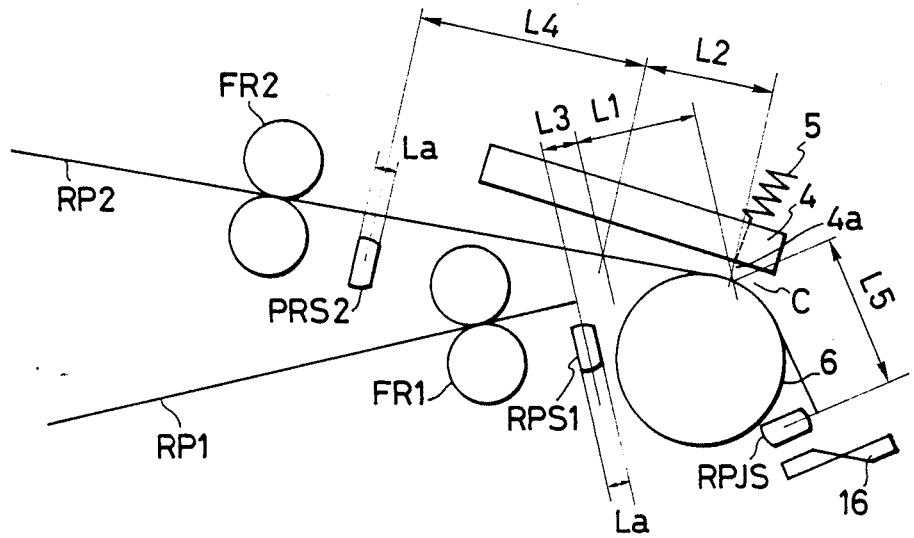
FIGS. 23 and 24 illustrate the operation of the fourth embodiment.
Figure 24:
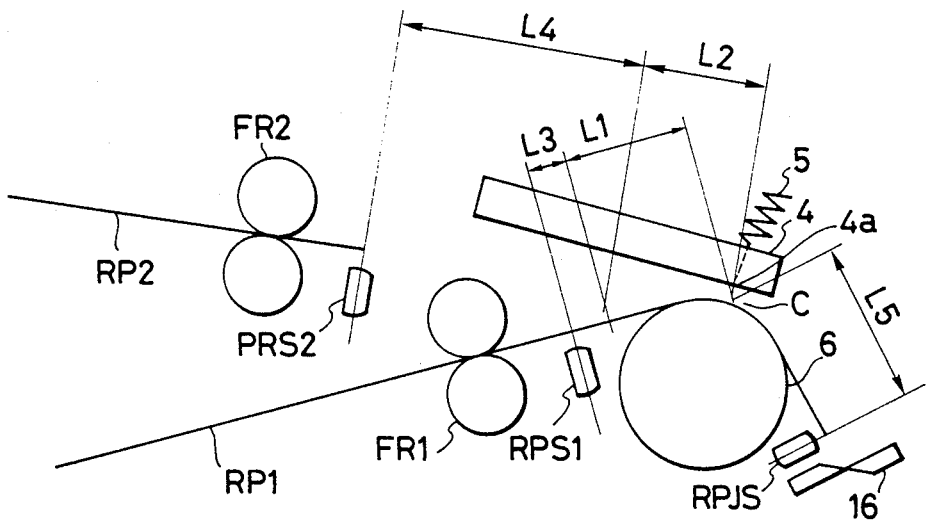

The distances L2 and L4 shown in FIGS. 23 and 24 are the distances on the sheet RP2 which correspond to the distances L1 and L3, respectively.

In the above-described embodiment, description has been made with respect to a case where the sensors RPS1 and RPS2 have detected white and black, respectively, but in a case where the sensors RPS1 and RPS2 have detected black and white, respectively, if in the foregoing description, S1 after RP is changed to S2 and S2 after RP is changed to S1, it follows that description thereof has been made.

In the above-described embodiment, when it is determined whether the sheet has come to the platen roller 6, the feed motor is not rotated and therefore, any unpleasant sound by the disorder of the feed motor is not produced.

In the present invention, the recording sheets are not limited to thermosensitive paper, but may also be plastic sheets or plain paper. The present invention is not restricted to the thermosensitive recording system shown herein, but is also applicable to an image recording apparatus using the so-called heat transfer recording system or the like using, for example, an ink sheet having ink.

In each of the aforedescribed embodiments, the terms "white detection" and "black detection" have been used, and these terms are applied where the recording sheets are white and the conveyance path is black, and "white detection" means the "presence of the recording sheet" and "black detection" means the "absence of the recording sheet". Accordingly, of course, the present invention is not restricted to "white detection" and "black detection".

According to the present embodiment, no unpleasant sound is produced from the feed motor and the reliability of the feed motor is not reduced.

A fifth embodiment of the present invention will now be described with reference to FIGS. 25 to 28.

The embodiment which will hereinafter be described relates to an image recording apparatus in which the edge of a slit is provided at the center of the optical path from the light-emitting portion of a photodetector device to the light-receiving portion thereof and moreover said slit is set from the center of the optical path toward the downstream side of the conveyance path of the recording paper and therefore the position of the leading end edge of the recording paper can be detected accurately and easily.

Figure 25:
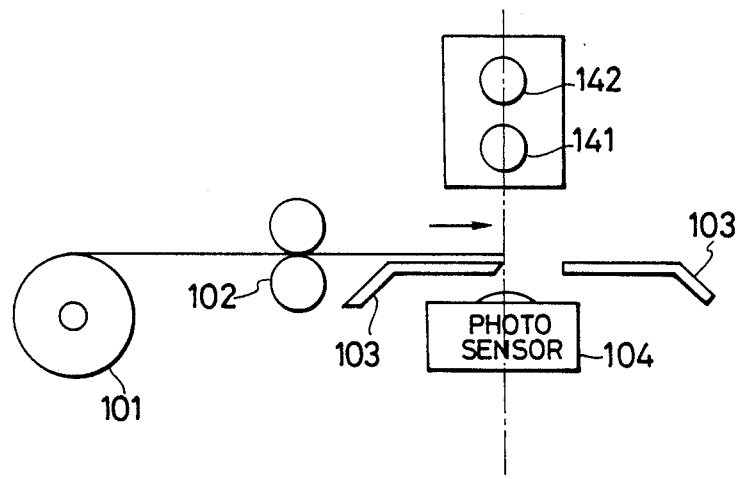
FIG. 25 illustrates an embodiment of the present invention.

FIG. 25 shows an embodiment of the present invention.

Figure 26:
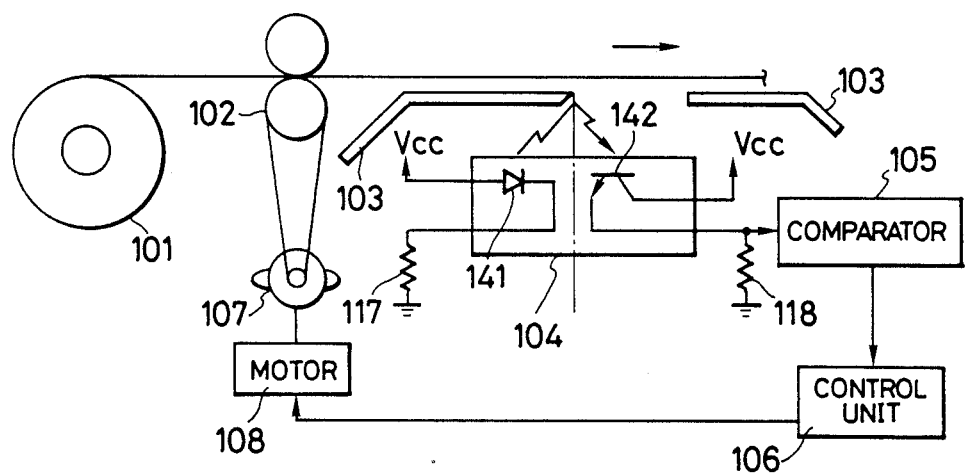
FIG. 26 shows the FIG. 25 embodiment more specifically.

FIG. 26 shows the embodiment more specifically.

Referring to these figures, this embodiment has a roll of recording paper 101, a roller 102 for conveying the recording paper 101, a guide plate 103 for guiding the conveyance of the recording paper 101, a reflection type photosensor 104 comprised of an LED 1 and a phototransistor 142, a comparator 105 for determining whether the output of the phototransistor in the photosensor 104 is greater or smaller than a reference value, a stepping motor 107 for rotating and stopping the roller 102, a motor driver 108 for driving the motor 107, and a control unit 106 for determining from the output of the comparator 105 whether the leading end edge of the recording paper is present at the position of the photosensor 104 and for controlling the conveyance of the recording paper 101 through the motor 107.

The present embodiment further has a resistor 117 for limiting the current of the LED 141, and a load resistor 118 for converting the photocurrent obtained by the phototransistor 142 into a voltage.

Also, as shown in FIGS. 25 and 26, there is the edge of the slit of the guide plate 103 at the center of the photosensor 104, and said slit exists at the tip of said edge as viewed in the direction of movement of the recording paper 101.

The operation of the above-described embodiment will now be described.

Figure 27A:
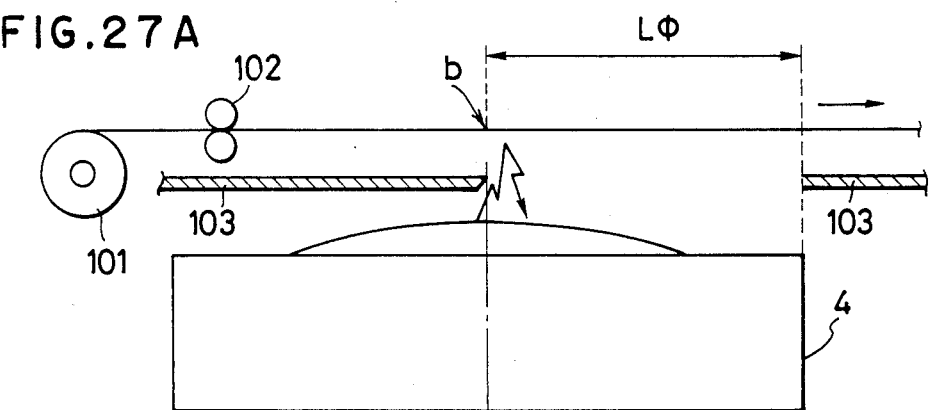
FIGS. 27A, 27B and 27C are illustrations of the FIG. 25 embodiment.
Figure 27B:
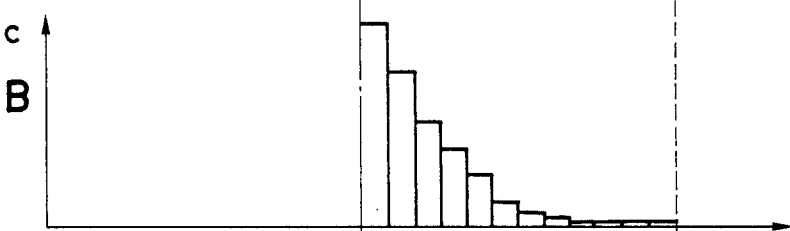
Figure 27C:
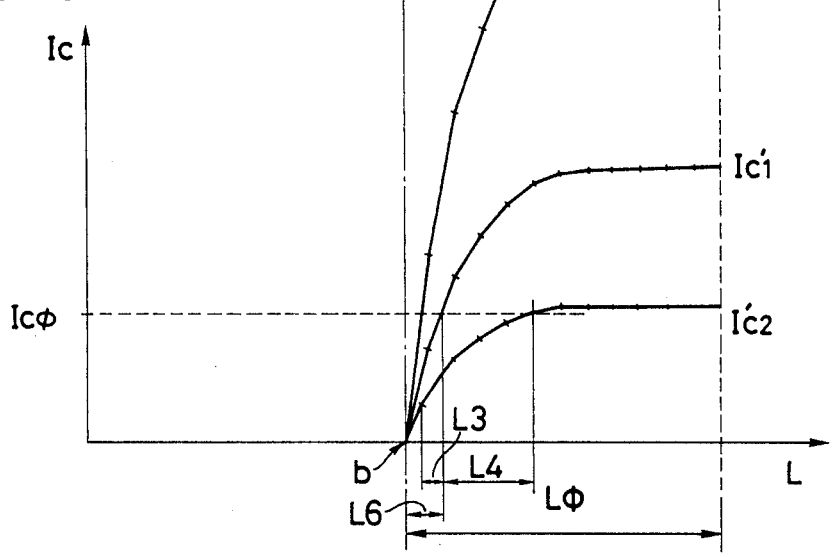

FIGS. 27A, 27B and 27C are illustrations of the above-described embodiment.

In FIG. 27, the threshold value of the comparator 105 for determining the presence or absence of the paper is $Ic\phi$. The characteristic of the photocurrent-the position of the leading end edge of the paper when use is made of a photosensor of the standard sensitivity is $Ic1'$, and in this case, when the leading end edge of the paper has been moved from a point b by L6, it is judged that the paper is present.

Also, it is to be understood that the characteristics of the photocurrent-the position of the leading end edge of the paper when use is made of photosensors of sensitivity twice the standard sensitivity and sensitivity of ½ of the standard sensitivity are $Ic3'$ and $Ic2'$, respectively.

When the leading end edge of the recording paper 101 has been moved from the point b in the direction of arrow, relative to the detected position of the leading end edge of the paper when a photosensor of the standard sensitivity is used (the right end of L6), the amounts of displacement of the detected position of the leading end edge of the paper when use is made of a photosensor of sensitivity twice the standard sensitivity and a photosensor of sensitivity of ½ of the standard sensitivity are L3 and L4, respectively.

Where for simplicity of description, it is assumed that $L\phi$ is 6 mm and the slit is 6 mm, the detected position of the leading end edge of the recording paper 101 changes as shown in Table 1 below between a case where the center of the photosensor and the center of the slit coincide with each other as in the example of the prior art shown in FIG. 5 and a case where as in the embodiment shown in FIG. 27, the edge of the slit is at the center of the photosensor and said slit exists at the top of said edge as viewed in the direction of movement of the recording paper 101.

TABLE 1

Relative to the detected position of the leading end edge of the paper when a photosensor of the standard sensitivity is used, the displacement of the detected position of the leading end edge of the paper when the sensitivity of the photosensor is changed

|  | Sensitivity of sensor is twice | Sensitivity of sensor is 1/2 |
|---|---|---|
| Prior art (central slit) | 0.8 mm (L1) | 3.0 mm (L2) |
| Embodiment (edge slit) | 0.35 mm (L3) | 1.9 mm (L4) |

That is, when in the example of the prior art, a photosensor of the standard sensitivity is used, the leading end edge of the recording paper is detected at 0.8 mm after the position of the leading end edge of the recording paper which can be detected when use is made of a photosensor of sensitivity twice the standard sensitivity, but when in the embodiment, a photosensor of the standard sensitivity is used, the leading end edge of the recording paper is detected only at 0.35 mm after the position of the leading end edge of the recording paper which can be detected when use is made of a photosensor of sensitivity twice the standard sensitivity. Also, when in the example of the prior art, use is made of a photosensor of sensitivity of ½ of the standard sensitivity, the leading end edge of the recording paper is detected at 3.0 mm after the position of the leading end edge of the recording paper which can be detected when a photosensor of the standard sensitivity is used, but when in the embodiment, use is made of a photosensor of sensitivity of ½ of the standard sensitivity, the leading end edge of the recording paper is detected only at 1.9 mm after the position of the leading end edge of the recording paper which can be detected when a photosensor of the standard sensitivity is used.

If the edge of the slit is provided at a point whereat the sensitivity of the photosensor is highest (in the case of the embodiment, the edge is set at the point b), the leading end edge of the paper can be detected near the point b in most cases, and even if the sensitivity of the photosensor becomes worse, the displacement of the detected position is slight as compared with that in the conventional central slit type.

Figure 28:
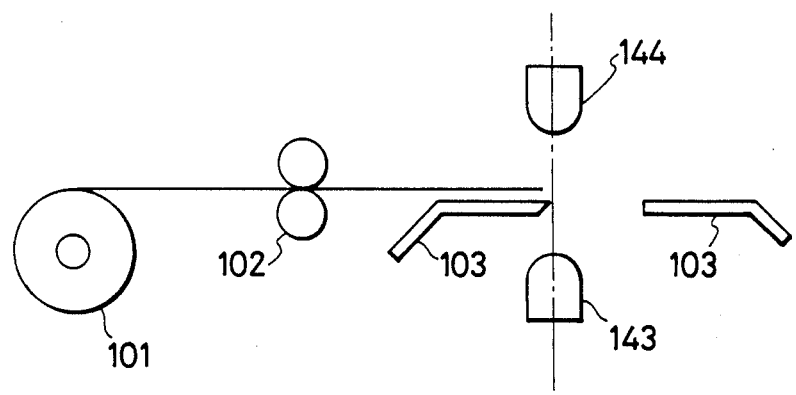
FIG. 28 shows a further embodiment of the present invention.

FIG. 28 shows another embodiment of the present invention in which a transmission type photosensor is used.

A light-emitting element 143 and a light-receiving element 144 are provided as the transmission type photosensor, and the optical path thereof is substantially at the same position as the edge of the guide plate 103.

According to the present embodiment, it is easy to detect the position of the leading end edge of the recording paper accurately.

As described above, the present invention provides an image recording apparatus which can accomplish the control of the recording sheet quickly and accurately.

I claim:

1. An image recording apparatus in which one of a plurality of recording sheets is selected and conveyed to an image recording section and image recording is effected on the selected recording sheet having:
   first recording sheet detecting means for detecting the presence of the recording sheets at a first predetermined position on the conveyance path of the recording sheets upstream of said recording section;
   second recording sheet detected means for detecting the presence of the recording sheets at a second predetermined position on the conveyance path of the recording sheets downstream of said recording section; and
   control means for conveying one of the recording sheets to said recording section when neither of said first and second recording sheet detecting means detects the presence of a recording sheet and conveying a leading edge of the other recording sheet to a recording standby position upstream of said recording unit.

2. An image recording apparatus according to claim 1, wherein the leading end edge of each of said recording sheet is detected, the movement distances from each of said detecting means to said recording section and said recording standby position are prestored in a memory, said recording sheets are conveyed by said movement distances, the leading end edge of one of said recording sheets is conveyed to said recording section, and the leading end edge of the remaining recording sheet is conveyed to said recording standby position.

3. An image recording method in which one of a plurality of recording sheets is selected and conveyed to an image recording section and image recording is effected on the selected recording sheet and wherein the presence of the recording sheets is detected at a first position upstream of said recording section and the presence of the recording sheets is detected at a second position downstream of said recording section, and the only one recording sheet is conveyed to said recording unit and the other recording sheet is conveyed to a recording standby position upstream of said recording section in conformity with the result of said two detections.

4. An image recording apparatus in which one of a plurality of recording sheets is selected and conveyed to an image recording section and image recording is effected on the selected recording sheet, having:
   first detecting means for detecting the presence of said recording sheets at a first predetermined position on the conveyance path of said recording sheets upstream of said recording section;
   second detecting means for detecting the presence of said recording sheets at a second predetermined position downstream of said recording section which is not opposed to the near-end mark of each of said recording sheets; and
   control means for conveying the leading end edges of said recording sheets to said recording section or a recording standby position in conformity with the result of the detection by said detecting means.

5. A recording apparatus in which a first recording sheet and a second recording sheet both wound in the form of a roll are contained, said first recording sheet or said second recording sheet is selectively conveyed to a recording section provided with a recording head and an image corresponding to image information is recorded on the selected recording sheet, having:
   an upstream sheet detecting portion for detecting the presence of said first recording sheet and said second recording sheet upstream of said recording section;
   a downstream sheet detecting portion for detecting the presence of said first recording sheet and said second recording sheet between said recording section and a cutter; and
   judging means for conveying said first recording sheet and said second recording sheet by a first predetermined amount when one sensor of said upstream sheet detecting portion detects the presence of the recording sheets and the other sensor of said upstream sheet detecting portion detects the absence of the recording sheets, conveying said first recording sheet and said second recording sheet by a second predetermined amount when the outputs of said one sensor and the other sensor do not change, and judging the recording sheet to be initialized, in conformity with the then output of said downstream sheet detecting portion.

6. An image recording apparatus for recording an image on a recording sheet, having:
   a conveyance path for conveying the recording sheet to an image recording section; and
   recording sheet detecting means having the edge of a slit provided at the center of the optical path from a light-emitting portion to a light-receiving portion and setting said slit from the center of said optical path toward the downstream side of said conveyance path.

7. A recording apparatus in which a first recording sheet and a second recording sheet both wound in the form of a roll are contained, said first recording sheet or said second recording sheet is selectively conveyed to a recording section provided with a recording head and an image corresponding to image information is recorded on the selected recording sheet, having:
   an upstream sheet detecting portion for detecting the presence of said first recording sheet and said second recording sheet upstream of said recording section;
   a downstream sheet detecting portion for detecting the presence of said first recording sheet and said second recording sheet; and
   judging means for conveying said first recording sheet and said second recording sheet by a first predetermined amount when one sensor of said upstream sheet detecting portion detects the presence of the recording sheets and another sensor of said upstream sheet detecting portion detects the absence of the recording sheets, conveying said first recording sheet and said second recording sheet by a second predetermined amount when the outputs of said one sensor and the other sensor do not change, and judging the recording sheet to be initialized, in conformity with the then output of said downstream sheet detecting portion.

8. A recording apparatus according to claim 7, wherein said downstream sheet detecting portion detects the presence of said first recording sheet and said second recording sheet between said recording section and a cutter.

* * * * *

UNITED STATES PATENT AND TRADEMARK OFFICE
CERTIFICATE OF CORRECTION

PATENT NO. : 4,980,717

DATED : December 25, 1990

INVENTOR(S) : MASAO KIGUCHI ET AL.

It is certified that error appears in the above-identified patent and that said Letters Patent is hereby corrected as shown below:

ON THE TITLE PAGE:

AT [56] REFERENCES CITED:

"44-112210 6/1969 Japan" should read
--44-12210 6/1969 Japan--.

SHEET 4

Figure 5B, "PERER" should read --PAPER-- and,
"PEPER" should read --PAPER--.

COLUMN 5

Line 20, "dow-" should read --down- --.
Line 27, "RP2," should read --RPS2--.

COLUMN 7

Line 43, "RRP2" should read --RP2--.

COLUMN 11

Line 37, "LED 1" should read --LED 141--.

UNITED STATES PATENT AND TRADEMARK OFFICE
CERTIFICATE OF CORRECTION

PATENT NO. : 4,980,717

DATED : December 25, 1990

INVENTOR(S) : MASAO KIGUCHI ET AL.

It is certified that error appears in the above-identified patent and that said Letters Patent is hereby corrected as shown below:

COLUMN 13

Line 38, "recording unit" should read --recording section--.

Signed and Sealed this

Twenty-fourth Day of November, 1992

Attest:

DOUGLAS B. COMER

Attesting Officer

Acting Commissioner of Patents and Trademarks